United States Patent
Kasai et al.

(10) Patent No.: US 9,862,557 B2
(45) Date of Patent: Jan. 9, 2018

(54) CONTAINER TERMINAL AND CONTROL METHOD THEREFOR

(75) Inventors: Hiroshi Kasai, Oita (JP); Nobuya Kayasuga, Oita (JP)

(73) Assignee: MITSUI ENGINEERING & SHIPBUILDING CO., LTD., Tokyo (JP)

( * ) Notice: Subject to any disclaimer, the term of this patent is extended or adjusted under 35 U.S.C. 154(b) by 508 days.

(21) Appl. No.: 14/008,494

(22) PCT Filed: Mar. 26, 2012

(86) PCT No.: PCT/JP2012/057714
§ 371 (c)(1),
(2), (4) Date: Dec. 5, 2013

(87) PCT Pub. No.: WO2012/133283
PCT Pub. Date: Oct. 4, 2012

(65) Prior Publication Data
US 2014/0079513 A1    Mar. 20, 2014

(30) Foreign Application Priority Data
Mar. 28, 2011  (JP) .................................. 2011-069868

(51) Int. Cl.
*B65G 63/00*    (2006.01)

(52) U.S. Cl.
CPC .................... *B65G 63/004* (2013.01)

(58) Field of Classification Search
CPC .... B65G 63/00; B65G 63/004; B65G 63/025; B65G 1/0485; B66C 1/101; B66C 19/007
(Continued)

(56) References Cited

U.S. PATENT DOCUMENTS

| 3,669,206 A | * | 6/1972 | Tax ...................... B65G 63/004 |
| | | | 104/29 |
| 3,754,669 A | * | 8/1973 | Alsen .................. B65G 63/004 |
| | | | 414/140.8 |

(Continued)

FOREIGN PATENT DOCUMENTS

| JP | 2005-75537 | * | 3/2005 | ............. B65G 63/00 |
| JP | 2005-075537 A | | 3/2005 | |

(Continued)

OTHER PUBLICATIONS

International Search Report of PCT/JP2012/057714, dated Jun. 26, 2012.

*Primary Examiner* — Anna M Momper
*Assistant Examiner* — Lynn E Schwenning
(74) *Attorney, Agent, or Firm* — Westerman, Hattori, Daniels & Adrian

(57) ABSTRACT

Provided are a container terminal and a control method therefor that enhance a cargo handling efficiency by reducing a movement of each yard crane to a minimum possible extent. The container terminal is provided with a first transfer area 44 outside one end portion of a storage lane 20, and a second transfer area 47 outside the other end portion. When a circulating transport vehicle 31 and a shuttle vehicle 32 transfer a container k therebetween via a first yard crane 13 in the first transfer area 44, the shuttle vehicle 32 transports the container k to a second yard crane 14, and the second yard crane 14 handles the container in an unloading container area 46 of the storage lane 20. When an external chassis 33 and the shuttle vehicle 32 transfer a container k therebetween via the second yard crane 14 in the second transfer area 47, the shuttle vehicle 32 transports the container k to the seaside yard crane 13 and the first yard crane (Continued)

13 handles the container in a loading container area 45 of the storage lane 20.

5 Claims, 7 Drawing Sheets

(58) Field of Classification Search
USPC ......... 414/139.4, 139.8, 139.9, 140.1, 140.3, 414/140.4, 341, 342, 390, 391, 392, 561
See application file for complete search history.

(56) References Cited

U.S. PATENT DOCUMENTS

| | | | | |
|---|---|---|---|---|
| 4,773,807 A | * | 9/1988 | Kroll | B65G 1/0485 414/266 |
| 5,540,532 A | * | 7/1996 | Carder | B65G 1/0407 414/279 |
| 6,190,107 B1 | * | 2/2001 | Lanigan, Sr. | B65G 1/0407 414/342 |
| 6,698,990 B1 | * | 3/2004 | Dobner | B65G 63/004 414/139.9 |
| 2006/0045659 A1 | * | 3/2006 | Hubbard, Sr. | B65G 63/045 414/139.4 |
| 2008/0025825 A1 | * | 1/2008 | Fujiwara | G01V 5/0008 414/279 |
| 2008/0107504 A1 | * | 5/2008 | Jung | B65G 1/0414 414/139.9 |
| 2008/0213067 A1 | * | 9/2008 | Jegers | B65G 1/0478 414/139.4 |
| 2009/0003985 A1 | * | 1/2009 | Lanigan, Sr. | B66C 19/007 414/814 |
| 2009/0191028 A1 | * | 7/2009 | Tian | B66C 19/002 414/140.3 |
| 2010/0021272 A1 | * | 1/2010 | Ward | B65G 63/004 414/137.1 |
| 2011/0217150 A1 | * | 9/2011 | Takehara | B65G 67/00 414/392 |

FOREIGN PATENT DOCUMENTS

| | | | | |
|---|---|---|---|---|
| JP | 4418195 B2 | | 2/2010 | |
| JP | 2011-093654 | * | 5/2011 | ............. B65G 63/00 |
| JP | 2011-093654 A | | 5/2011 | |

* cited by examiner

CONTAINER TERMINAL AND CONTROL METHOD THEREFOR

TECHNICAL FIELD

The present invention relates to a container terminal and a control method therefor that enhance a cargo handling efficiency and save energy consumption by shortening a moving distance of a yard crane straddling a storage lane in the container terminal.

BACKGROUND ART

A container terminal is a facility where containers are loaded to or unloaded from ships and containers are carried in and out by external chassis for overland transport. The container terminal also is a facility where the containers unloaded or carried in are temporarily stored.

Nowadays, along with rapid evolution of container transport systems in international traffic routes, cargo handling and storing works in container terminals have been required to achieve further automation and energy saving. More specifically, what are important are automation, efficiency enhancement, cost reduction and the like in operations of transporting containers between ships and a container terminal and storing containers in the container terminal.

To address this, there is a container terminal including: storage lanes extended in a direction substantially perpendicular to a quay; an automated guided vehicle configured to switch direction between the storage lanes; and an area which has a gate placed on the opposite side from the quay side, and in which a external chassis and a transfer crane (yard crane) perform cargo handling (for example, see Patent Document 1). This container terminal is capable of increasing a storage area ratio and achieving further automation of the container terminal because external chassis, i.e., the external chassis attended by operators do not enter the storage region.

However, this container terminal has a problem of a poor cargo handling efficiency, in particular, in operations of carrying a container stored in the storage lane out to the external chassis and carrying a container in from the external chassis and storing it in the storage lane, since the yard crane moves over the storage lane while holding containers. This is because the moving speed of the yard crane is approximately 18 km/h, which is quite low.

Meanwhile, in the container terminal described in Patent Document 1 still requires the moving distance of each transfer crane (yard crane) to be increased to place containers in arrangement enabling efficient loading onto the ship or carrying-out to the external chassis. In the case where a storage lane is provided to extend in a direction perpendicular to the traveling direction of the quay cranes, in other words, in the land-and-sea direction, the cargo handling efficiency is enhanced if containers carried in from external chassis and being to be loaded on ships are placed on the seaside of the storage lane while containers unloaded from ships and being to be carried out to external chassis are placed on the landside of the storage lane. The container terminal described in Patent Document 1 has an efficiency reduction particularly in carrying containers out to and in from the external chassis because the yard crane travels over the storage lane while hoisting up the containers.

Moreover, the method in which a yard crane hoists and transports containers is poor in cargo handling efficiency, and therefore has a problem of wasteful energy consumption.

Meanwhile, there is a container terminal which is provided with yard cranes configured to move in a longitudinal direction of a storage lane, and is designed to dividedly store containers to be carried out and containers carried in. This container terminal includes a yard crane 111 straddling a storage lane 110, and a large yard crane 112 straddling the yard crane 111 as illustrated in FIG. 14. Since the yard crane 111 and the yard crane 112 can pass each other without collision, this container terminal can store containers k in the storage lane 110 in efficient arrangement. However, the container terminal still has to move the yard cranes 111 and 112 for long distances, and requires a longer time accordingly. In addition, there also arises a problem that the manufacturing cost and maintenance cost for the large-scale yard crane 112 are high.

PRIOR ART DOCUMENT

Patent Document

Patent Document 1: Japanese Patent No. 4418195

SUMMARY OF THE INVENTION

Problem to be Solved by the Invention

The present invention has been made in view of the foregoing problems, and has an objective to provide a container terminal and a control method therefor that are capable of making cargo handling more efficient by reducing a moving distance (traveling distance) of a yard crane, and by placing containers carried in by a external chassis and being to be loaded to a ship and containers unloaded from a ship and being to be carried out by a external chassis in efficient arrangement in a storage lane. Additionally, an objective of the present invention is to provide a container terminal and a control method therefor that are capable of saving energy consumption.

Means for Solving the Problems

To solve the foregoing problems, a container terminal of the present invention includes multiple quay cranes configured to handle containers for a ship, multiple storage lanes where to place containers in predetermined positions, at least two yard cranes straddling each of the storage lanes, multiple circulating transport vehicles configured to transport containers to the quay cranes and the yard cranes, and multiple external chassis configured to transport containers to an outside of the container terminal, and further includes a shuttle vehicle configured to transport a container in a field adjacent to each of the storage lanes by moving back and forth in a longitudinal direction between two yard cranes one of which handles containers for the circulating transport vehicles or the external chassis outside one end portion of the each storage lane, and the other of which handles the containers in the each storage lane.

According to this configuration, the circulating transport vehicles or the external chassis and the shuttle vehicle can transfer a container therebetween via the one yard crane outside the end portion of the storage lane, and the shuttle vehicle can transport the container to the other yard crane. The use of the shuttle vehicle to transport containers in the region of the storage lane makes it possible to shorten the moving distances (traveling distances) of the yard cranes, and consequently shorten the time required for a cargo handling work. In addition, energy consumption can be saved by shortening the moving distances (traveling distances) of the yard cranes, and by transporting the containers by the shuttle vehicles which are lighter in weight and consume less energy.

In addition, the aforementioned container terminal is provided with a first transfer area where the circulating transport vehicles and each of the shuttle vehicles transfer containers therebetween via a first yard crane configured to handle the containers for the circulating transport vehicles, and a second transfer area where the shuttle vehicle and the external chassis transfer containers therebetween via a second yard crane configured to handle the containers for the external chassis. The container terminal is configured such that the shuttle vehicle is formed of an automated guided vehicle, and a shuttle route connecting the first transfer area and the second transfer area is provided.

According to this configuration, the shuttle vehicle can move to the first transfer area and the second transfer area, and the first or second crane can transfer a container from the circulating transport vehicle or the external chassis to the shuttle vehicle, or from the shuttle vehicle to the circulating transport vehicle or the external chassis while not moving almost at all. Thus, the moving distance of the yard crane can be shortened more.

The provision of the first transfer area where the first yard crane handles containers for the circulating transport vehicles makes it possible to reduce the cost by shortening the traveling distances of the circulating transport vehicles, and at the same time by reducing the number of circulating transport vehicles while using the shuttle vehicles needing lower cost than the circulating transport vehicles. In addition, the provision of the second transfer area for handling containers for the external chassis leads to an increase in the safety.

Moreover, according to this configuration, the shuttle vehicles only have to move back and forth in the longitudinal direction of the storage lanes, and thus can be manufactured at lower cost than the circulating transport vehicles. Further, if the shuttle route is formed of rails, the control of the shuttle vehicle can be simplified. Accordingly, the cost for the shuttle vehicles can be made much lower.

Additionally, the aforementioned container terminal is configured such that the circulating transport vehicles are each formed of an automated guided vehicle configured to switch direction, and multiple transfer routes are provided in the first transfer area to branch off from a traveling route in which the circulating transport vehicles circulate in a quay apron region and to extend in substantially parallel to the shuttle track to the end portion of each of the storage lanes.

According to this configuration, the multiple transfer routes and the shuttle track of the shuttle vehicle can be provided in substantially parallel to each other, and the first yard crane can straddle the transfer routes. This can smooth the transfer of containers between the circulating transport vehicles and the shuttle vehicle via the first yard crane in the first transfer area. When the transfer routes and the shuttle route are located in substantially parallel to each other, there is no need to change the direction of the container when mounting the container on each of the circulating transport vehicles and the shuttle vehicle. Moreover, since the multiple circulating transport vehicles can stop traveling right below the first yard crane, the cargo handling efficiency for a ship can be enhanced.

Instead, the aforementioned container terminal is configured such that the circulating transport vehicles are each formed of an automated guided vehicle configured to switch direction, and a shared route is provided in the first transfer area to branch off from a traveling route in which the circulating transport vehicles circulate in a quay apron region and to extend to the shuttle route.

According to this configuration, the circulating transport vehicle can stop right below the first yard crane, the first yard crane can hoist a container up by using a hoist tool, the shuttle vehicle can stop right below the first yard crane after the circulating transport vehicle gets out of the place right below the yard crane, and then the first yard crane can hoist the contained down by using the hoist tool. Thus, the first yard crane does not have to move a trolley traversely. For this reason, a time required to transfer a container between the circulating transport vehicle and the shuttle vehicle via the yard crane can be reduced, and the operation of the first yard crane can be simplified.

In order to achieve the foregoing objectives, in a method for controlling a container terminal of the present invention, the container terminal including multiple quay cranes configured to handle containers for a ship, multiple storage lanes where to place containers in predetermined positions, at least two yard cranes straddling each of the storage lanes, multiple circulating transport vehicles configured to transport containers to the quay cranes and the yard cranes, and multiple external chassis configured to transport containers to outside of the container terminal, one of the yard cranes handles containers for the circulating transport vehicles or the external chassis outside one end portion of each of the storage lanes; another one of the yard crane handles containers at a predetermined position in the storage lane; and the shuttle vehicle configured to travel in a field adjacent to each of the storage lanes by moving back and forth in a longitudinal direction transports the containers to the yard cranes.

According to this method, a distance of transporting a container by the yard crane whose moving speed is lower than that of the shuttle vehicle is shortened, and the shuttle vehicle whose moving speed is higher than that of the yard crane can transport the container by a distance corresponding to the shortened distance. Thus, the cargo handling efficiency of the container terminal can be enhanced. In addition, when the energy consumption is compared between the yard crane and the shuttle vehicle, the energy consumption of the shuttle vehicle is less. Thus, the transportation of a container by the shuttle vehicle in place of the yard crane results in saving of the energy consumption.

Moreover, in the aforementioned method for controlling a container terminal, in transferring a container from the ship or any of the external chassis to any of the storage lanes, one of the yard cranes transfers the container to the corresponding shuttle vehicle from any of the circulating transport vehicles or the external chassis outside one end portion of the storage lane, the shuttle vehicle transports the container to another one of the yard crane, and the other yard crane places the container in the storage lane, and in transferring a container from any of the storage lanes to the ship or any of the external chassis, one of the yard cranes transfers the container from the storage lane to the corresponding shuttle vehicle, the shuttle vehicle transports the container to another one of the yard crane, and the other yard crane transfers the container from the shuttle vehicle to any of the circulating transport vehicles or the external chassis outside one end portion of the storage lane.

According to this method, in unloading a container from the ship, the circulating transport vehicle having received the container from the quay crane stops in the first transfer area outside the end portion of the storage lane, and the first yard crane positioned in that place receives the container and passes the container to the shuttle vehicle. The shuttle vehicle having received the container travels in the field adjacent to the storage lane and transports the container to the second yard crane positioned at a place for storing the container on the storage lane. The second yard crane can place the transported container in a predetermined position in the storage lane.

In carrying the container in from the external chassis, the external chassis stops in the second transfer area outside the end portion of the storage lane, and the second yard crane receives the container and passes the container to the shuttle vehicle. The shuttle vehicle having received the container transports the container to the first yard crane positioned at a place for storing the container. The first yard crane can place the transported container in a predetermined position in the storage lane.

In loading a container onto the ship or carrying a container out to the external chassis, similarly, one of the yard cranes transfers the container from a predetermined position of the storage lane to the shuttle vehicle, and the shuttle vehicle transports the container to the other yard crane positioned outside the end portion of the storage lane. The latter yard crane can pass the container to the circulating transport vehicle or the external chassis. Thus, the moving distance of each yard crane having a low moving speed is reduced to a minimum possible extent, and the shuttle vehicle moving back and forth in the proximity of the storage lane covers the reduction by transporting the container. In this way, the cargo handling work can be made efficient. Further, in addition to the saving of the energy consumption by enhancing the cargo handling efficiency, the energy consumption can be further saved by reducing the transportation of the container by the yard crane while the shuttle vehicle performs the reduced transportation, instead.

Furthermore, with loading or unloading to and from a ship taken into account, the arrangement of containers in the storage lane achieves highest cargo handling efficiency if containers to be loaded to the ship are placed in the seaside of the storage lane, while containers unloaded from the ship are placed in the landside of the storage lane. According to the above method, containers can be placed in the storage lane in the most efficient arrangement while the moving distance of each yard crane is reduced to a minimum possible extent.

Effects of the Invention

According to the present invention, the moving distance of each yard crane can be shortened even when containers are placed in positions efficient for carrying in and carrying out, and the moving distance of each yard crane can be also shortened when containers are transferred from the storage lane to the quay cranes and the external chassis. Thus, the cargo handling efficiency of the container terminal can be enhanced. Moreover, the enhancement of the cargo handling efficiency of the container terminal and lowering of power consumption by reducing the transportation of containers by the yard cranes result in low energy consumption of the container terminal.

MODES FOR CARRYING OUT THE INVENTION

Hereinafter, with reference to the drawings, description is provided for container terminals 10 and methods for controlling the container terminal 10 according to embodiments of the present invention.

Figure 1:
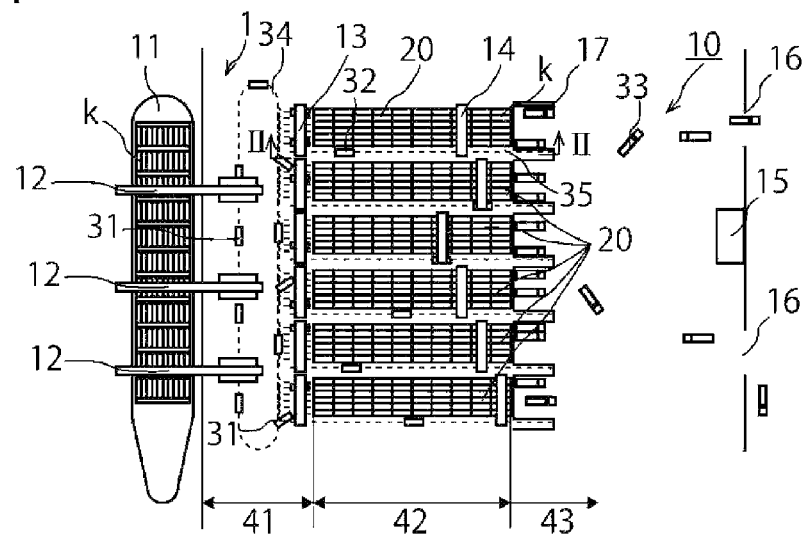
FIG. 1 is a plan view illustrating a container terminal of a first embodiment according to the present invention.

As illustrated in FIG. 1, a container terminal 10 of a first embodiment according to the present invention includes a ship 11 that berths at a quay 1, three quay cranes 12 configured to handle containers k for the ship 11, and storage lanes 20 each having a longitudinal direction arranged in a land-and-sea direction or a direction perpendicular to a traveling direction of the quay cranes 12 (a traversing direction of the quay cranes 12) and having containers k placed therein in predetermined positions. Here, as one example, the container terminal 10 includes 6 storage lanes having the longitudinal direction arranged in the traversing direction of the quay cranes 12. However, some container terminal 10 may include a storage lane having a longitudinal direction arranged in the traveling direction of the quay cranes 12 and include any number of lanes. In addition, any number of quay cranes 12 may be installed for one ship 11, and the number of ships 11 is not limited to one. The container terminal 10 includes a quay apron region 41 located closest to the sea, a storage region 42 where the storage lanes 20 are installed, and a gate yard 43.

The quay apron region 41 is provided with a traveling route 34 in which the quay cranes 12 and circulating transport vehicles 31 travel. The quay cranes 12 handle containers k for a single ship 11 by rolling up and down hoist tools and moving trolleys back and forth in the traversing direction (land-and-sea direction). The container k is a container of ISO standard having a width of 8 feet, a height of 8 feet, a length of 20 feet or 40 feet, but may be a container of another standard.

The circulating transport vehicles 31 are each formed of an automated guided vehicle (hereinafter referred to as an AGV) configured to pass through the quay cranes 12 and travel in the traveling route 34 which circulates in a loop form in the quay apron region 41. The circulating transport vehicle 31 is not limited to the AGV, but may be an attended vehicle. From the viewpoint of efficiency, the AGV is suitable. The traveling route 34 is formed by burying a magnetic tape or the like. The circulating transport vehicle 31 senses the magnetic tape with a sensor, and thereby is able to run without departing from the traveling route 34, or to control its travelling direction even when selecting the traveling direction at a branch point or an intersection. In addition, the circulating transport vehicle 31 is configured to be capable of switching direction.

Each of the circulating transport vehicles 31 just circularly travels in the quay apron region 41. Thus, as compared with a conventional one, the traveling distance is significantly reduced, and the maintenance cost can be made low because a failure or the like is unlikely to occur. The circulating transport vehicles 31 are not limited to the foregoing configuration but may have any configuration capable of transporting containers k.

The storage region 42 is provided with multiple storage lanes 20, first yard cranes 13 and second yard cranes 14 each of which straddles one of the storage lanes 20 and is movable back and forth in a longitudinal direction of the storage lane 20, the first yard crane 13 provided on a seaside (hereinafter referred to as the seaside yard crane 13), the second yard crane 14 provided on a landside (hereinafter referred to as the landside yard crane 14), shuttle vehicles 32 which are movable back and forth in the longitudinal direction of the storage lanes 20 in fields adjacent to the respective storage lanes 20, and shuttle routes 35 for the respective shuttle vehicles 32.

The gate yard 43 is provided with a management building 15 which includes a control system configured to control at least the circulating transport vehicles 31 and the shuttle vehicles 32 both of which are unattended, and which sends instructions to the quay cranes 12, the seaside yard cranes 13, the landside yard cranes 14 and external chassis 33 all of which are attended. The gate yard 43 is also provided with gates 16 serving as an entrance from and an exit to the outside. Here, reference numeral 33 indicates the external chassis 33.

Figure 2:
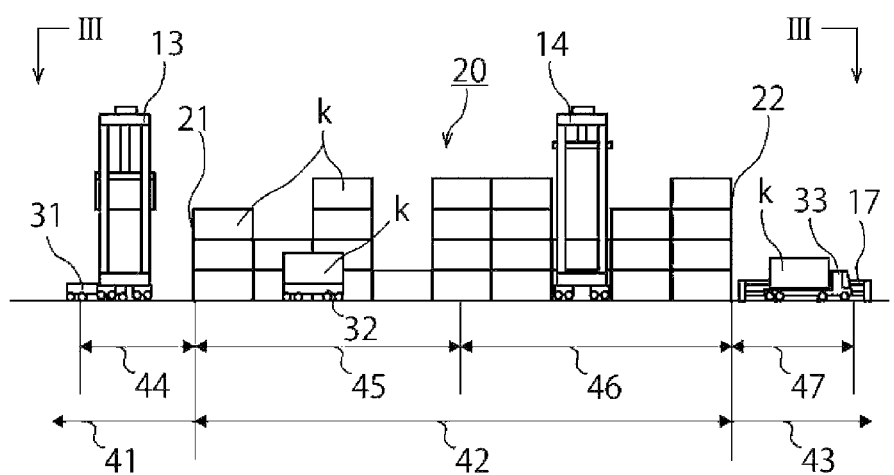
FIG. 2 is a view on arrow II-II in FIG. 1.

As illustrated in FIG. 2, each of the storage lanes 20 includes a first end portion 21 (hereinafter referred to as the seaside end portion 21) and a second end portion 22 (hereinafter referred to as the landside end portion 22). A first transfer area 44 (hereinafter referred to as the seaside transfer area 44) is provided in an area in the quay apron region 41 in contact with the seaside end portion 21. The storage region 42 is provided with a seaside loading container area 45 where containers carried in are mainly stored, and a landside unloading container area 46 where containers to be carried out are mainly stored. A second transfer area 47 (hereinafter referred to as the landside transfer area 47) is provided in an area of the gate yard 43 in contact with the landside end portion 22.

The seaside transfer area 44 is an area where the circulating transport vehicles 31 and the shuttle vehicle 32 transfer containers k therebetween through the seaside yard cranes 13. The landside transfer area 47 is an area where the shuttle vehicle 32 and the external chassis 33 transfer containers k therebetween through the landside yard cranes 14.

Conventionally, the circulating transport vehicle 31 travels to the yard crane 13 or 14 of a designated storage lane 20, for example, among the storage lanes 20 by running in the proximity of the storage lane 20. Accordingly, the traveling distance of the circulating transport vehicle 31 is long. The transportation of a container k to a place near the landside end portion 22 of the storage lane 20 is especially time-consuming because the circulating transport vehicle 31 makes a round trip along the storage lane 20 and then returns to each of the quay cranes 12. In order to make up for a reduction in the cargo handling efficiency due to time-consuming transportation, the number of circulating transport vehicles 31 is increased.

The provision of the seaside transfer area 44 enables the circulating transport vehicle 31 to receive or pass a container k in the seaside transfer area 44, then quickly return to the traveling route 34 and transport a container K from the quay crane 12 again. Hence, containers k can be loaded to and unloaded from the ship 11 successively. Thus, the traveling distance of the circulating transport vehicle 31 can be shortened. This makes it possible to not only reduce the number of costly circulating transport vehicles 31, but also reduce the cost for maintenance thereof. Although the shuttle vehicle 32 needs to be provided to transport containers k to and from the yard cranes 13, 14, the shuttle vehicle 32 only has to be movable back and forth in the proximity of the storage lane 20, and has a simpler structure than the circulating transport vehicle 31. Thus, the cost can be kept low.

In addition, for the attended external chassis 33, the landside yard cranes 14 perform cargo handling in the landside transfer area 47 provided outside the landside end portion 22 of the storage lane 20. For this reason, the attended external chassis 33 are kept from entering the storage region 42. In particular, the safety is enhanced since there is no occasion where a container k or the landside yard crane 14 passes right above a driver's seat where a driver is seated.

The loading container area 45 is an area for placing containers k carried in by the external chassis 33 from the outside of the container terminal 10 and being to be loaded onto the ship 11. On the other hand, the unloading container area 46 is an area for placing containers k unloaded from the ship 11 and being to be carried out by the external chassis 33 to the outside of the container terminal 10. The cargo handling efficiency is enhanced more by container arrangement in which the storage lane 20 is roughly divided into a seaside area as the loading container area 45 and a landside area as the unloading container area 46. Note that this division is merely a rough division and is not limited to the above configuration. For example, in the case of a hub port where containers are unloaded and loaded from a ship to a ship, the containers can be stored undividedly.

Figure 3:
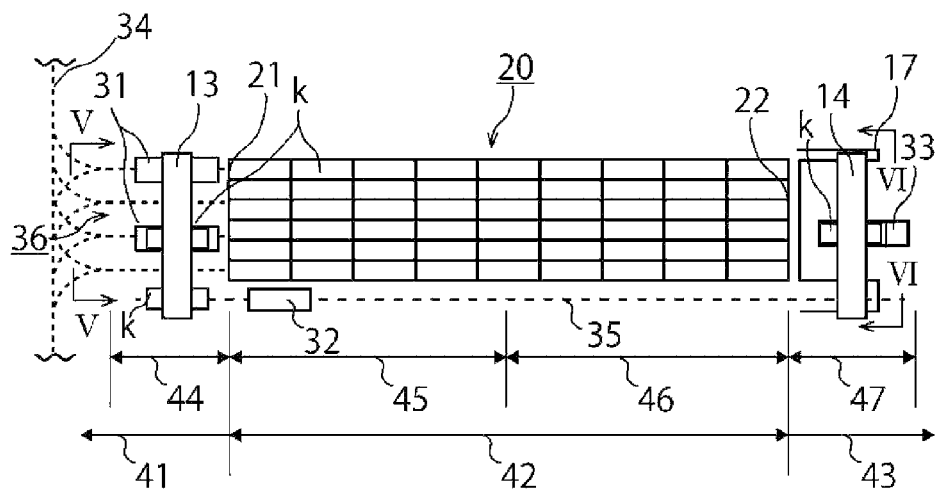
FIG. 3 is a view on arrow in FIG. 2.

As illustrated in FIG. 3, the shuttle route 35 of the shuttle vehicle 32 connects the seaside transfer area 44 and the landside transfer area 47 which are areas adjacent to the storage lane 20. The shuttle route 35 may be formed of a magnetic tape, or may be formed in the form of rails since the shuttle vehicle 32 only travels back and forth. The shuttle vehicle 32 is also formed of an AGV as similar to the circulating transport vehicle 31, but does not need to have the same performance specifications as the circulating transport vehicle 31. The shuttle vehicle 32 includes wheels capable of running on the rails, and a motor controllable for forward and backward rotational operations or a mechanism configured to control forward and backward running of the wheels while operating a motor in steady rotation. The shuttle vehicle 32 is just controlled in its operations by a device to control forward and backward motions. Thus, the manufacturing cost of the shuttle vehicle 32 is lower than that of the circulating transport vehicle 31.

Figure 4:
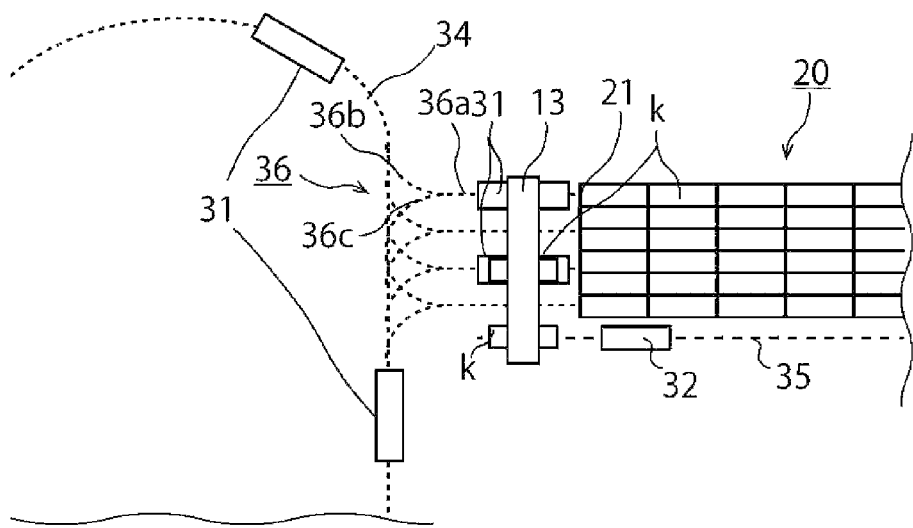
FIG. 4 is an enlarged view of a seaside transfer area (first transfer area) 44 in FIG. 2.

As illustrated in FIG. 4, each of transfer routes 36 of the circulating transport vehicle 31 provided in the seaside transfer area 44 branches off from the traveling route 34 and extends to the seaside end portion 21. The transfer route 36 includes a standstill track 36a where the circulating transport vehicle 31 is to stop, an access track 36b that allows the circulating transport vehicle 31 to enter the standstill track 36a from the traveling route 34, and an exit track 36c that allows the circulating transport vehicle 31 to switch direction and exit from the standstill track 36a to the traveling route 34. If the circulating transport vehicle 31 is formed to be capable of running in all the directions instead of switching direction, the transfer route 36 may be formed only using a standstill track 36a that extends to the traveling route 34. The circulating transport vehicle 31 is controlled to stop traveling in the standstill track 36a in order that the seaside yard crane 13 from or to which a container k is to be received or passed will not move in every cargo handling operation.

Figure 5:
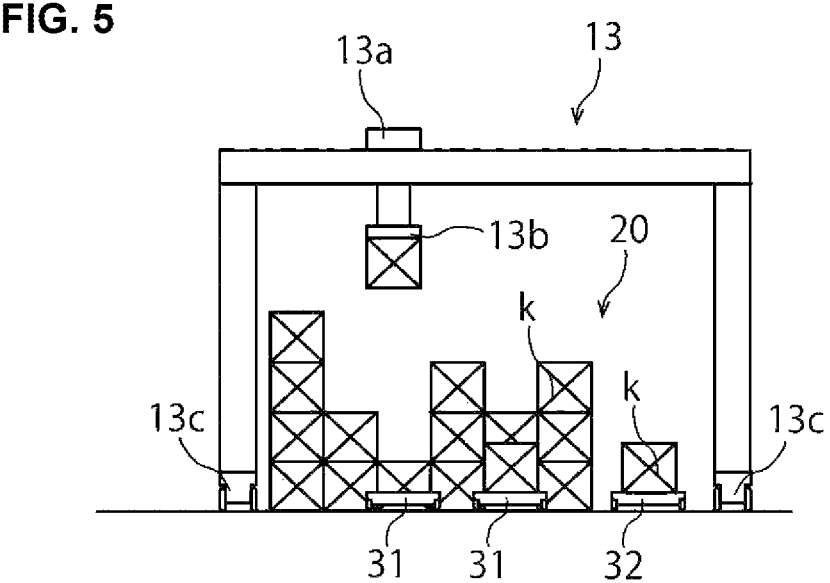
FIG. 5 is a view on arrow V-V in FIG. 2.

As illustrated in FIG. 5, the seaside yard crane 13 is provided to straddle the storage lane 20 and the traveling route 34 of the shuttle vehicle 32. In addition, in the seaside transfer area 44, the seaside yard crane 13 straddles multiple circulating transport vehicles 31 and the shuttle vehicle 32. The seaside yard crane 13 includes a trolley 13a configured to move traversely, a hoist tool 13b, and a travelling device 13c for traveling over the storage lane 20.

The provision of the transfer route 36 and the seaside yard crane 13 as described above allows multiple circulating transport vehicles 31 to transport containers k to the seaside transfer area 44. This transportation is more efficient than in the case where the circulating transport vehicles 31 perform transportation one by one in turns. Moreover, either of the circulating transport vehicle 31 and the shuttle vehicle 32 does not have to wait for an operation of the other.

Figure 6:
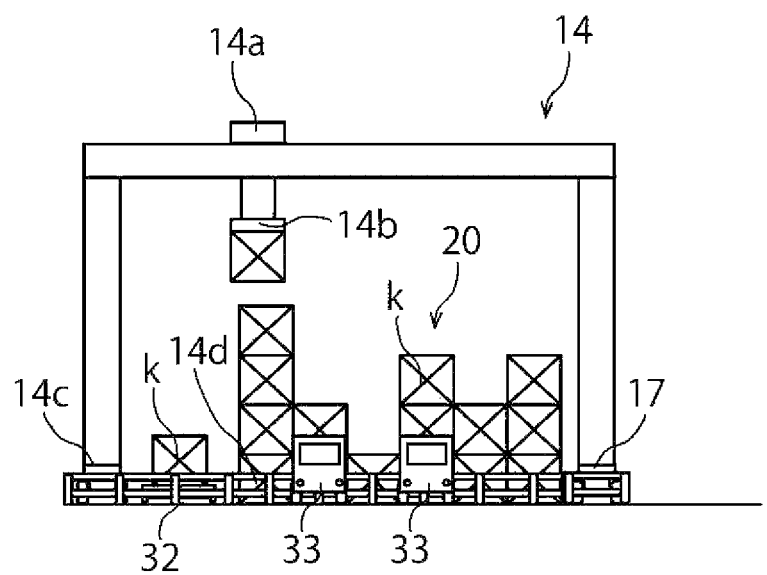
FIG. 6 is a view on arrow VI-VI in FIG. 2.

As illustrated in FIG. 6, the landside yard crane 14 has a structure similar to the seaside yard crane 13. In addition, since the external chassis 33 are attended, a safety fence 17 is provided with the safety taken into account to prevent the external chassis 33 from entering the region where the landside yard crane 14 and the shuttle vehicle 32 travel. The safety fence 17 thus provided does not allow any attended external chassis 33 to enter the storage region 42, and thereby can prevent an accident such as a collision of the external chassis 33 with the landside yard crane 14 or the shuttle vehicle 32. In addition, since the container terminal 10 is divided into a region operated without human attendance and a region operated with human attendance, the region operated without human attendance can be further automated.

The container terminal 10 having the above configuration is controlled so that at least the circulating transport vehicles 31 and the shuttle vehicles 32 operate automatically, and the control is taken by a computer of the management building 15 provided in the gate yard 41.

Figure 7:
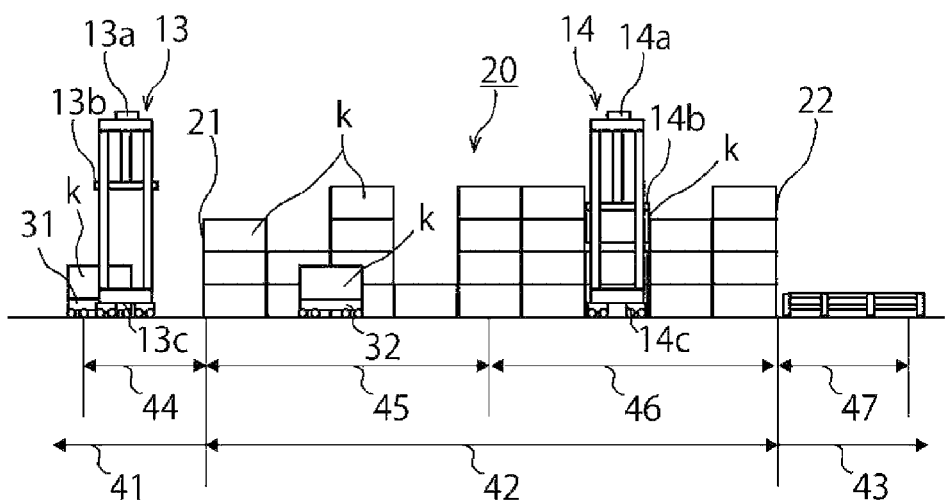
FIG. 7 is a view on arrow II-II in FIG. 1, which illustrates an operation of unloading a container from a ship.
Figure 8:
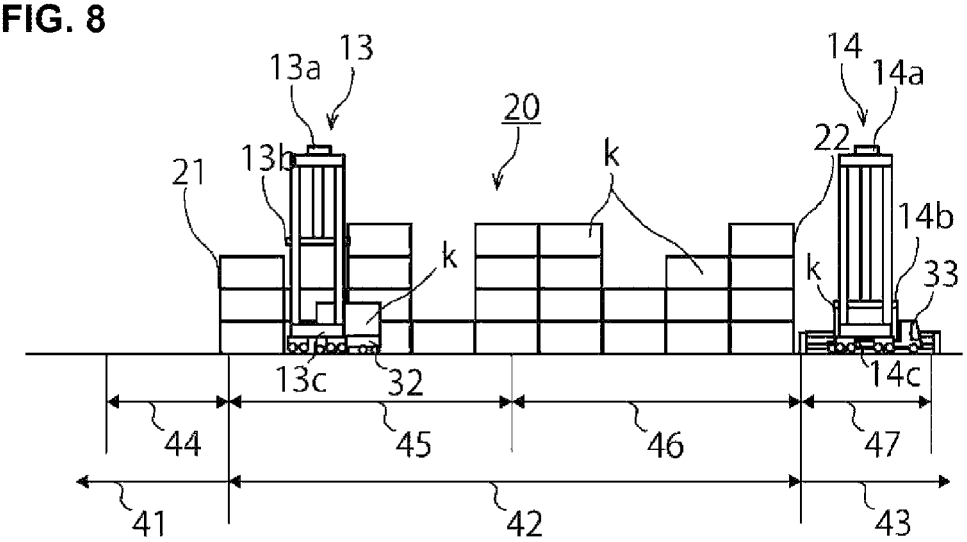
FIG. 8 is a view on arrow II-II in FIG. 1, which illustrates an operation of carrying a container in from an external chassis.
Figure 9:
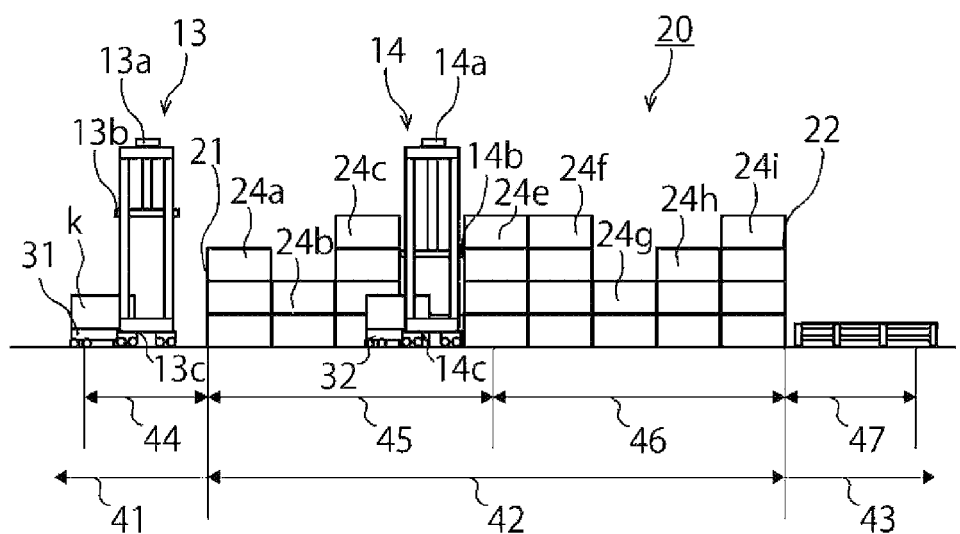
FIG. 9 is a view on arrow II-II in FIG. 1, which illustrates an operation of loading a container to a ship.
Figure 10:
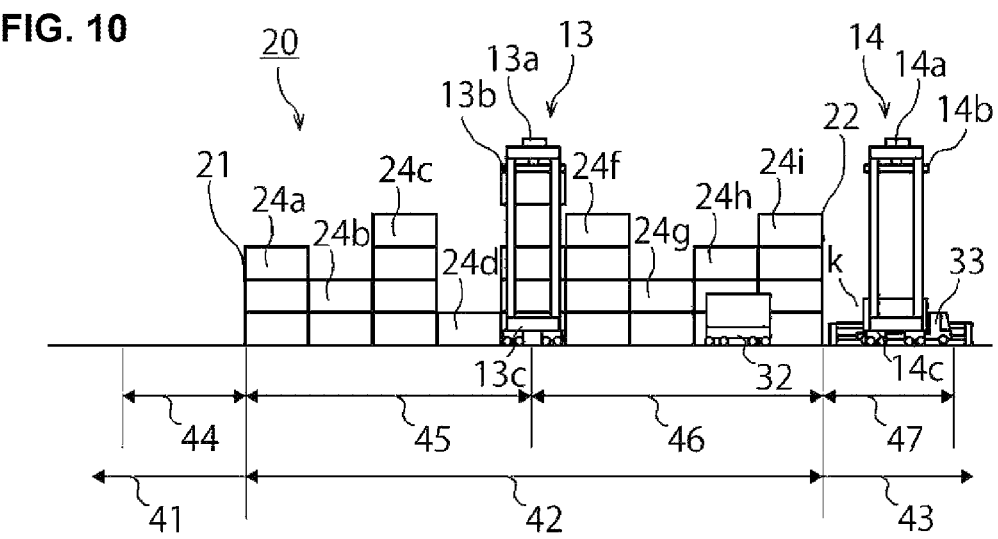
FIG. 10 is a view on arrow II-II in FIG. 1, which illustrates an operation of carrying a container out to an external chassis.

Next, description is provided for a cargo handling operation of a container k performed in the container terminal 10 according to the first embodiment of the present invention. FIG. 7 illustrates an operation of unloading a container k from the ship 11 to the storage lane 20 by using the circulating transport vehicle 31. FIG. 8 illustrates an operation of carrying a container k in from the external chassis 33 to the storage lane 20. FIG. 9 illustrates an operation of loading a container k from the storage lane 20 to the ship 11 by using the circulating transport vehicle 31. FIG. 10 illustrates an operation of carrying a container k out from the storage lane 20 to the external chassis 33.

A difference between the operation of unloading a container k from the ship 11 to the storage lane 20 by using the circulating transport vehicle 31 and the operation of carrying a container k in from the external chassis 33 to the storage lane 20 lies in the circulating transport vehicle 31 and the external chassis 33. Hence, the unloading operation illustrated in FIG. 7 is described herein.

As illustrated in FIG. 7, before the circulating transport vehicle 31 stops in the transfer route 36, the seaside yard crane 13 moves to the seaside transfer area 44 and is on standby. Moreover, in order to hoist the container k up at a position where the circulating transport vehicle 31 will stop, the seaside yard crane 13 moves the trolley 13a to the stop position of the circulating transport vehicle 31. Then, at a moment when the circulating transport vehicle 31 stops, the seaside yard crane 13 rolls down the hoist tool 13b, the hoist tool 13b grabs the container k, and the seaside yard crane 13 hoists the container K up. The circulating transport vehicle 31 having passed the container k to the seaside yard crane 13 switches direction and returns to the traveling route 34, and then again circularly travels in order to receive a container k from the quay crane 12.

During the above operation or before the completion of the operation, the shuttle vehicle 32 returns to the seaside transfer area 44 and stops travelling. The seaside yard crane 13 moves the trolley 13a traversely to the position right above the shuttle vehicle 32, rolls down the hoist tool 13b, and passes the container k to the shuttle vehicle 32. The shuttle vehicle 32 having received the container k runs in the shuttle route 35 and travels to the landside yard crane 14 which is on standby at a designated position for placing the container k in the unloading area 46. The landside yard crane 14 is on standby with a trolley 14a moved to a position where the shuttle vehicle 32 will stop.

At a moment when the shuttle vehicle 32 stops, the landside yard crane 14 rolls down a hoist tool 14b, the hoist tool 14b grabs the container k, and the landside yard crane 14 hoists the container k up. The shuttle vehicle 32 having passed the container k to the landside yard crane 14 returns to the seaside transfer area 44. The landside yard crane 14 hoisting up the container k moves the trolley 14a traversely, stops the trolley 14a at a designated position, rolls down the hoist tool 14b and thereby places the container k in a predetermined position in the storage lane 20. The operation of unloading a container k from the ship 11 is completed in the aforementioned actions. This operation is performed for all designated containers k in the ship 11.

The operation of carrying a container k in from the external chassis 33 to the storage lane 20 is a similar operation if the aforementioned operation is altered by using the external chassis 33 in place of the circulating transport vehicle 31, exchanging the roles of the seaside yard crane 13 and the landside yard crane 14 with each other, and using the landside transfer area 47 in place of the seaside transfer area 44 as the area for receiving and passing the container k from and to the shuttle vehicle 32.

The foregoing operation enables containers k unloaded from the ship 11 to be placed in a landside of the storage lane 20 in order to be easily carried out to the external chassis 33, and also enables reduction in movements of the yard cranes 13, 14 in the operation work. Thus, the cargo handling efficiency can be enhanced. In the reversed manner, containers k carried in from the external chassis 33 can be placed in a seaside of the storage lane 20 in order to be easily loaded to the ship 11.

In addition, the circulating transport vehicle 31 takes the role of transporting the container k in the quay apron region, one of the seaside yard crane 13 and the landside yard crane 14 takes the role of receiving and passing the container k while the other takes the role of placing the container k, the shuttle vehicle 32 takes the role of transporting the container k between the yard cranes, and the external chassis 33 takes the role of carrying the container k to the outside. Such division of the roles into the instruments makes the control easy, and brings achievement of high cargo handling efficiency.

Next, description is provided for the operation of carrying a container k in from the external chassis 33 to the storage lane 20 and the operation of loading a container k from the storage lane 20 to ship 11 by using the circulating transport vehicle 31. These operations are similar methods if the roles of the seaside yard crane 13 and the landside yard crane 14 are reversed and the external chassis 33 is used in place of the circulating transport vehicle 31. Hence, the description herein is provided for the method of loading a container k placed in the loading container area 45 to the ship 11, which is illustrated in FIG. 9.

The seaside yard crane 13 is moved to the seaside transfer area 44 and is put on standby. The landside yard crane 14 is moved to a landside of the loading container area 45 and is put on standby. The distance between a container to be loaded to the ship 11 and the seaside yard crane 13 is calculated. Then, if the distance is within a predetermined range, the seaside yard crane 13 moves to the loading container area 45, holds the container k and transports the container k to the circulating transport vehicle 31. If the distance exceeds the predetermined range, the landside yard crane 14 passes the container k to the shuttle vehicle 32, and the shuttle vehicle 32 transports the container k to the seaside yard crane 13. The circulating transport vehicle 31 having received the container k switches direction in the transfer route 36, returns to the traveling route 34, and transports the container k to the quay crane 12. The quay crane 12 loads the container k onto the ship 11. The loading of the container k onto the ship 11 is completed in the above actions.

The aforementioned predetermined range is set to, for example, a range up to a container row 24c at the midpoint of the loading container area 45 of the storage lane 20 as illustrated in FIG. 9. In this case, for carrying in a container k in a container row 24a, the seaside yard crane 13 moves to the container row 24a, returns to the seaside transfer area 44 while holding the container k and passes the container k to the circulating transport vehicle 31. On the other hand, for carrying in a container k in a container row 24e, the landside yard crane 14 moves to the container row 24e, and passes the container k to the shuttle vehicle 32. The shuttle vehicle 32 transports the container k to the seaside yard crane 13. Then, the container k is passed to the circulating transport vehicle 31 via the seaside yard crane 13. This predetermined range is not limited to the above. For example, work times required in the case using the shuttle vehicle 32 and the case not using the shuttle vehicle 32 are calculated in advance, and the range may be determined based on the calculated work times.

The method of carrying a container k placed in the unloading container area 46 in the storage lane 20 out to the external chassis 33 is a similar method if the above loading method on the ship 11 is altered by reversing the roles of the seaside yard crane 13 and the landside yard crane 14 and using the external chassis 33 in place of the circulating transport vehicle 31, as illustrated in FIG. 10.

In the above method, if the transportation of a container k by the yard crane 13 or 14 can complete the work for a shorter time, the transportation by the yard crane 13 or 14 can be selected. On the other hand, if the distance to the container k is so long that the transportation by the shuttle vehicle 32 can complete the work for a shorter time, the other transportation by the yard crane 13 or 14 and the shuttle vehicle 32 can be selected. Thus, the cargo handling can be performed efficiently.

Figure 11:
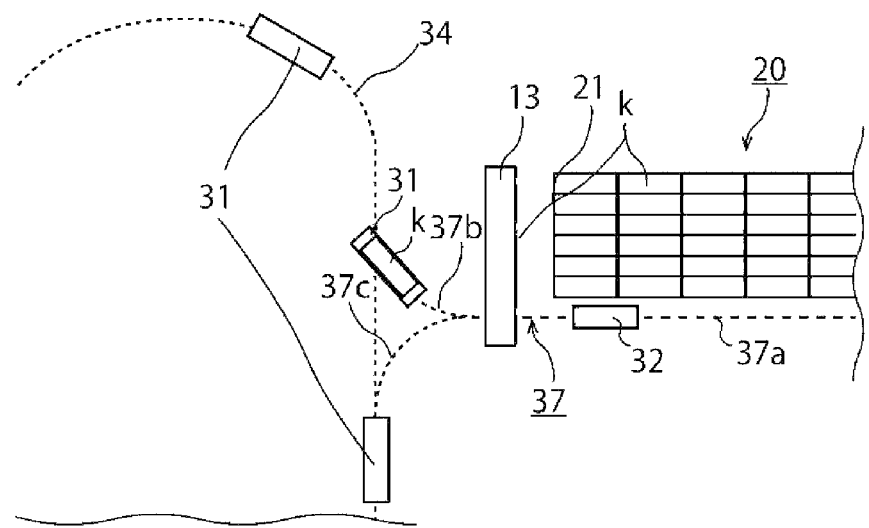
FIG. 11 is an enlarged view illustrating a part of a container terminal of a second embodiment according to the present invention.

Next, a container crane 10 of a second embodiment according to the present invention is described. As illustrated in FIG. 11, a shared route 37 is provided in place of the transfer routes 36 provided in the seaside transfer area 44 and the shuttle route 35 where the shuttle vehicle 32 travels in the container terminal 10 having the foregoing configuration. The shared route 37 includes a shuttle track 37a extending between a seaside transfer area 44 and a landside transfer area 45, an access track 37b that allows a circulating transport vehicle 31 to enter the shuttle track 37a from the traveling route 34, and an exit track 37c that allows the circulating transport vehicle 31 to switch direction and exit from the shuttle track 37a to the traveling route 34. The shuttle track 37a is formed such that a shuttle vehicle 32 can travel therein.

The circulating transport vehicle 31 transports a container k, and a seaside yard crane 13 hoists the container k up. Then, the circulating transport vehicle 31 switches direction and returns to the traveling route 34, and, at the same time, a shuttle vehicle 32 enters under the seaside yard crane 13. Then, the seaside yard crane 13 passes the container k to the shuttle vehicle 32.

Since the routes where the circulating transport vehicle 31 and the shuttle vehicle 32 travel are unified into one route, the above operation enables the seaside yard crane 13 to receive and pass the containers k by only performing the operation of rolling up and down a hoist tool 13b. Thus, there is no need to move a trolley 13a traversely, and the work time can be reduced accordingly. In addition, the energy consumption can be saved by an amount corresponding to the omission of a traversing motion of the trolley 13a.

Figure 12:
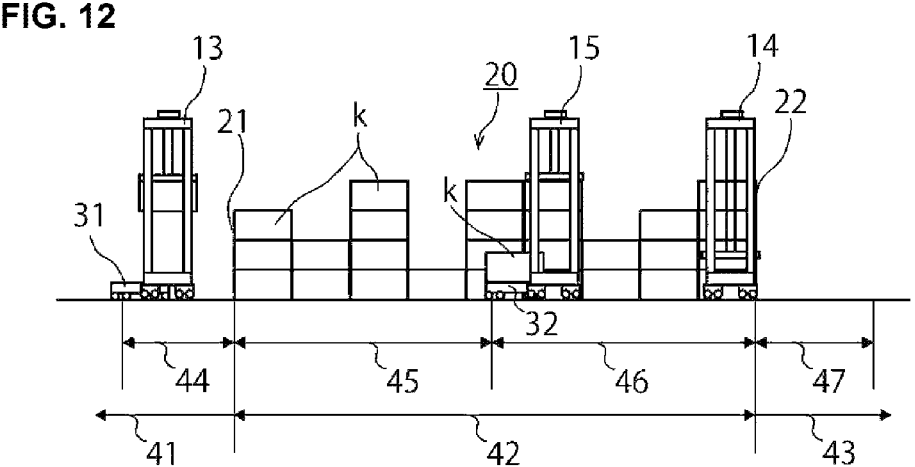
FIG. 12 is a view illustrating a container terminal of a third embodiment according to the present invention.

In a third embodiment according to the present invention, a middle yard crane 15 is provided between a seaside yard crane 13 and a landside yard crane 14 of a storage lane 20 as illustrated in FIG. 12. For example, for unloading a container k from a ship 11, the landside yard crane 14 and the middle yard crane 15 can be put on standby in an unloading container area 46, and one of the cranes 14, 15 located closer to a predetermined position can perform cargo handling in placing the container k in the predetermined position. Thus, the cargo handling efficiency can be further enhanced.

Figure 13:
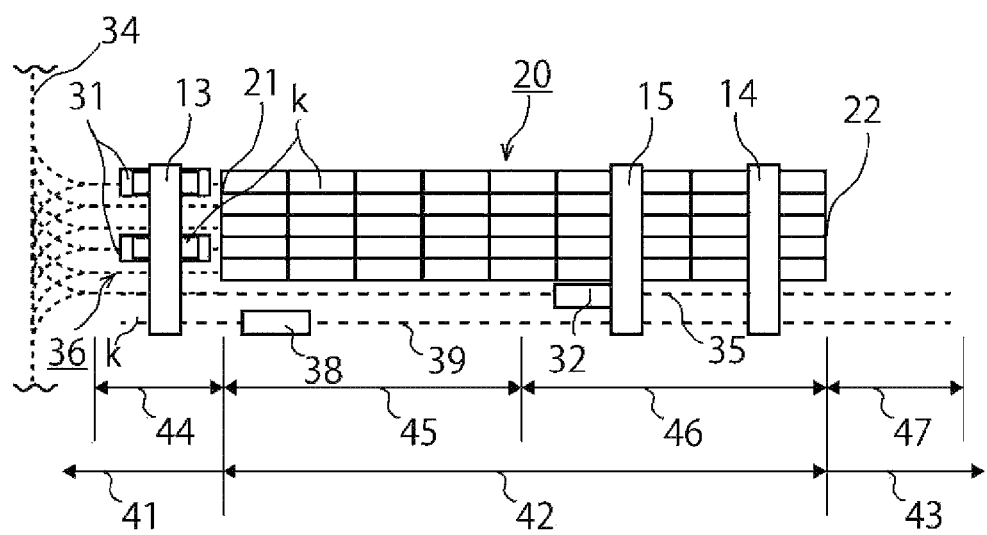
FIG. 13 is a view illustrating a container terminal of a fourth embodiment according to the present invention.
Figure 14:
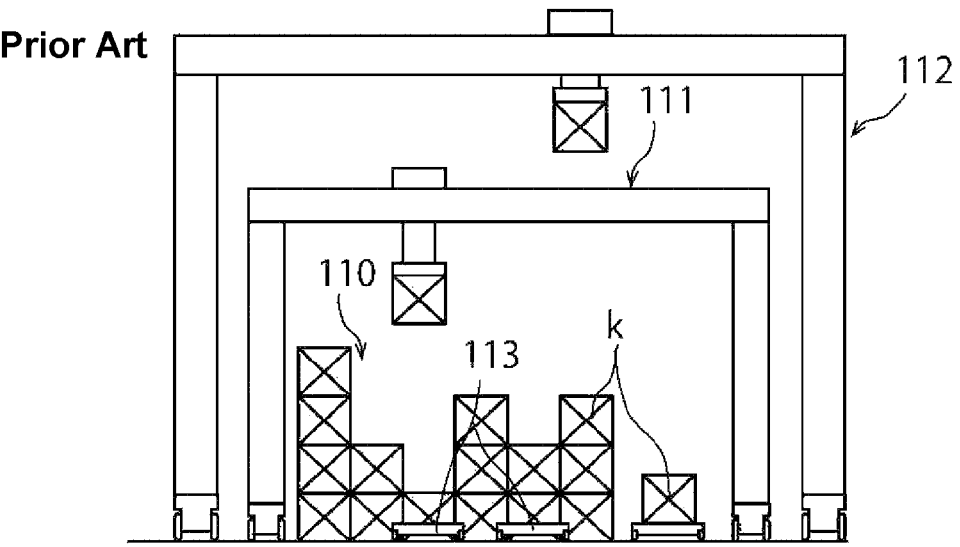
FIG. 14 is a front view illustrating a part of a conventional container terminal.

In a fourth embodiment according to the present invention, as illustrated in FIG. 13, the above configuration is provided with another shuttle route 39 next to the shuttle route 35 in the proximity of the storage lane 20 and another shuttle vehicle 38 configured to travel therein. Since the two shuttle vehicles 32 and 38 can transport containers k, the cargo handling efficiency can be enhanced.

A container terminal 10 of the present invention is not limited to the above configurations. For instance, other 6 storage lanes may be provided at a landside of the storage lanes 20. In this case, a traveling route 34 of circulating transport vehicles 31 is formed to circulate around the storage lanes 20 and the circulating transport vehicles 31 transport containers to seaside transfer areas of the landside storage lanes. Instead, a shuttle vehicle may be provided which is movable back and forth between each seaside storage lane and the corresponding landside storage lane, and the shuttle vehicle having received a container in the seaside transfer area of the seaside storage lane may transport the container to the landside storage lane.

In addition, the storage lane 20 may be formed to have its longitudinal direction arranged in a direction substantially parallel to the quay. Even in this case, the storage lanes may be preferably arranged so that the first transfer areas 44 or the second transfer areas 47 of the respective storage lanes 20 can be lined up. Instead, the longitudinal directions of the respective storage lanes 20 may be arranged in two or more directions.

A control system of the foregoing container terminal 10 is implemented in a personal computer or the like in the management building 15 and controls the entire container terminal 10 as well. The control system controls the automatic driving of the circulating transport vehicles 31 and the shuttle vehicles 32 and controls the coordination of the operations of the individual instruments. Moreover, if the yard cranes 13, 14 and the quay cranes 12 are automated, the quay apron region 41 and the storage region 42 can be completely unattended.

Further, the control system also manages each of containers k placed in the storage lanes 20. The control system can issue commands to the instruments so that containers k can be stacked in the order of carrying-in and carrying-out.

INDUSTRIAL APPLICABILITY

In handling containers, the container terminal of the present invention reduces the movement of each of the yard cranes to a minimum possible extent, and instead transports the containers by the shuttle vehicles. Thus, the container terminal can enhance the cargo handling efficiency and save the energy consumption. Hence, the container terminal installed at a quay or the like can be used as a base for marine transport and overland transport.

EXPLANATION OF REFERENCE NUMERALS

1 quay
10 container terminal
11 ship
12 quay crane
13 seaside yard crane
14 landside yard crane
15 management building
16 gate
17 safety fence
20 storage lane
21 seaside end portion
22 landside end portion
31 circulating transport vehicle
32 shuttle vehicle
33 external chassis
34 traveling route
35 shuttle route
36 transfer route
37 shared route
41 quay apron region
42 storage region
43 gate yard
44 seaside transfer area
45 loading container area
46 unloading container area
47 landside transfer area

The invention claimed is:

1. A container terminal comprising:
a plurality of storage lanes in which to store a container, each storage lane having first and second end portions,
a first transfer area located outside the first end portions of the storage lanes in a longitudinal direction of the storage lanes,
a second transfer area located outside the second end portions of the storage lanes in a longitudinal direction of the storage lanes,
a traveling route having a first portion located in the first transfer area and a second portion located outside the first transfer area,
a plurality of transfer routes provided in the first transfer area and branching off from the traveling route, each transfer route including a standstill track substantially parallel to the shuttle route and provided in the first transfer area,
a plurality of shuttle routes, each shuttle route being associated with one of the storage lanes and including an area extending along a longitudinal direction area adjacent to the storage lane, and also including an end extending into the first transfer area, wherein the shuttle routes and the traveling route are not connected,
a plurality of shuttle vehicles, each configured to transport a container and being movable in one of the shuttle routes,
a plurality of circulating transport vehicles, each transport vehicle being movable in one of the transfer routes, wherein each standstill track provides an area for one of the transport vehicles to stop,
a plurality of first yard cranes, each of the first yard cranes straddling one of the storage lanes and being movable back and forth in a longitudinal direction thereof and into the first transfer area to straddle the shuttle route and the standstill track, and configured for transferring a container between one of the circulating transport vehicles stopped on one of the standstill tracks and one of the shuttle vehicles on the shuttle route, and
a plurality of second yard cranes, each of the second yard cranes straddling one of the storage lanes and being movable back and forth in a longitudinal direction thereof and into the second transfer area for transferring the container between an outside of the second transfer area and the shuttle vehicle, wherein each of the first yard cranes and the second yard cranes straddling the same one of the storage lanes forms a pair,
wherein each shuttle vehicle travels back and forth between the first and second yard cranes straddling each storage line, and the first and second yard cranes define travel limits for the shuttle vehicle movable in the shuttle route associated therewith.

2. The container terminal according to claim 1, further comprising an apron region that includes and extends beyond the first transfer area in a longitudinal direction of the storage lanes, wherein
the circulating transport vehicles are each formed of an automated guided vehicle configured to switch direction,
the second portion of the traveling route is located in the apron region, and
the plurality of transfer routes are provided in the apron region, wherein after branching off from the traveling route, the transfer routes extend substantially parallel to the shuttle route to the end portion of each of the storage lanes.

3. The container terminal according to claim 1, further comprising an apron region that includes and extends beyond the first transfer area in a longitudinal direction of the storage lanes, wherein
the circulating transport vehicles are each formed of an automated guided vehicle configured to switch direction, the second portion of the traveling route is located in the apron region, and after branching off from the traveling route, the transfer routes extend substantially parallel to the shuttle track to the end portion of each of the storage lanes.

4. A method for controlling a container terminal according to claim 1, comprising the steps of:

stopping the first yard crane of a pair of first and second yard cranes in the first transfer area, while the second yard crane of the pair of first and second yard cranes is on standby at a designated position in the storage lane, stopping one of the circulating transport vehicles in the standstill track of one of the transfer routes provided in the first transfer area, and stopping one of the shuttle vehicles in the shuttle route in the first transfer area, with the circulating transport vehicle and the shuttle vehicle below the first yard crane of the pair of first and second yard cranes, using the first yard crane of the pair of first and second yard cranes to receive a container carried from outside the storage lane and then to pass the container to the shuttle vehicle stopped below the first yard crane of the pair of first and second yard cranes, using the shuttle vehicle which received the container to transport the container to the second yard crane of the pair of first and second yard cranes, which is on standby, and using the second yard crane of the pair of first and second yard cranes to receive the container from the shuttle vehicle and then to store the container in the storage lane, wherein the shuttle vehicle only travels back and forth between the pair of first and second yard cranes.

5. The method for controlling a container terminal according to claim 4, further comprising:

placing containers carried in by an external chassis and to be loaded to a ship in a seaside of any of the storage lanes having a longitudinal direction arranged in a land-and-sea direction, and placing containers unloaded from the ship and to be carried out by the external chassis in a landside of the storage lane.

\* \* \* \* \*